(12) United States Patent
Pierce et al.

(10) Patent No.: US 9,198,107 B1
(45) Date of Patent: Nov. 24, 2015

(54) MANAGING NETWORK SELECTION FOR WIRELESS COMMUNICATION

(71) Applicant: Sprint Spectrum LP, Overland Park, KS (US)

(72) Inventors: Robert Pierce, Great Falls, VA (US); Aaron Hinkle, Centreville, VA (US); Frank Celentano, Damascus, MD (US)

(73) Assignee: Sprint Spectrum L.P., Overland Park, KS (US)

( * ) Notice: Subject to any disclaimer, the term of this patent is extended or adjusted under 35 U.S.C. 154(b) by 238 days.

(21) Appl. No.: 14/037,157

(22) Filed: Sep. 25, 2013

(51) Int. Cl.
*H04W 4/00* (2009.01)
*H04W 36/24* (2009.01)

(52) U.S. Cl.
CPC .................................. *H04W 36/245* (2013.01)

(58) Field of Classification Search
USPC ............... 455/436, 439, 440, 443, 432.1, 428
See application file for complete search history.

(56) References Cited

U.S. PATENT DOCUMENTS

| | | | |
|---|---|---|---|
| 7,293,088 B2 | 11/2007 | Douglas et al. | |
| 7,844,266 B2 | 11/2010 | Jeyaseelan et al. | |
| 8,190,152 B2 | 5/2012 | Jeyaseelan et al. | |
| 8,190,191 B2 | 5/2012 | Livet et al. | |
| 9,001,754 B2 * | 4/2015 | Kato et al. | 370/329 |
| 2005/0059400 A1 * | 3/2005 | Jagadeesan et al. | 455/436 |
| 2006/0227744 A1 * | 10/2006 | Metke et al. | 370/331 |
| 2012/0077488 A1 | 3/2012 | Unger et al. | |
| 2012/0184276 A1 * | 7/2012 | Pichna et al. | 455/436 |
| 2013/0223408 A1 * | 8/2013 | Brandt et al. | 370/331 |

FOREIGN PATENT DOCUMENTS

EP 2320689 A1 * 5/2011

* cited by examiner

*Primary Examiner* — David Q Nguyen

(57) ABSTRACT

In systems and methods of managing network selection for a wireless device, a record is sent to a wireless device in communication with a first communication network, the record comprising a plurality locations where other wireless devices have changed from communicating with the first communication network to communicating with a second communication network and a plurality of timer durations. At least one of the plurality of timer durations is associated with one of the plurality of locations. It is determined that the wireless device has entered one of the plurality of locations, and a timer is started using the at least one timer duration associated with the entered location. Before the at least one timer expires, the wireless device is prevented from changing from communicating with the first communication network to communicating with the second communication network.

20 Claims, 7 Drawing Sheets

MANAGING NETWORK SELECTION FOR WIRELESS COMMUNICATION

TECHNICAL BACKGROUND

Wireless communication networks are typically enables to address issues arising from wireless device mobility such as connectivity, communication session continuity, and so forth. Wireless connection issues related to device mobility can arise when a signal level of a communication link between a wireless device and an access node drops below a threshold level requirement, caused, for example, by radio frequency interference, or by the device moving away from an effective coverage area of the first access node. Additionally, the coverage area of the access node may include areas of low signal level, caused by topography, structures, signal interference, and the like. When the signal level drops below a required threshold level, a wireless communication system will typically attempt to maintain communication with the wireless device by identifying a second access node and instructing the wireless device to communicate with the second access node.

OVERVIEW

In operation, a record is sent to a wireless device in communication with a first communication network, the record comprising a plurality locations where other wireless devices have changed from communicating with the first communication network to communicating with a second communication network and a plurality of timer durations. At least one of the plurality of timer durations is associated with one of the plurality of locations. It is determined that the wireless device has entered one of the plurality of locations, and a timer is started using the at least one timer duration associated with the entered location. Before the at least one timer expires, the wireless device is prevented from changing from communicating with the first communication network to communicating with the second communication network.

DETAILED DESCRIPTION

Figure 1:
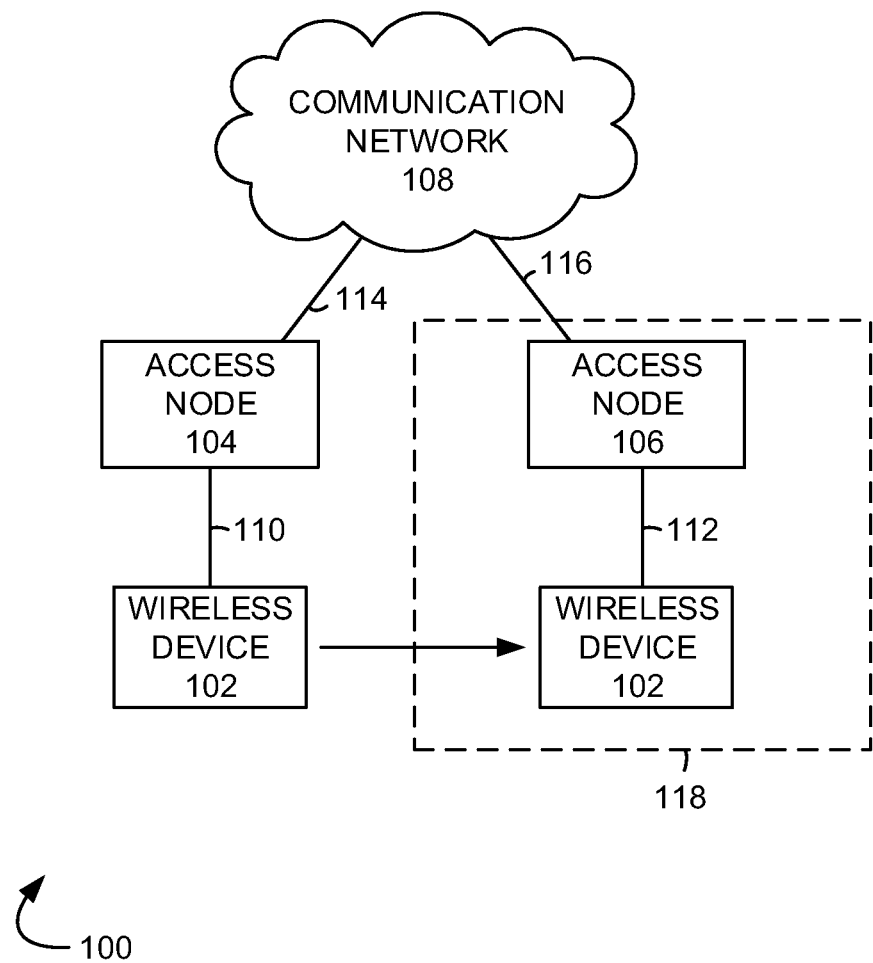
FIG. 1 illustrates an exemplary communication system to manage network selection for wireless device communication.

FIG. 1 illustrates an exemplary communication system 100 to manage network selection for wireless device communication comprising wireless device 102, access node 104, access node 106, and communication network 108. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication link 110, and can communicate with access node 106 over communication link 112.

Access nodes 104 and 106 are each is a network node capable of providing wireless communications to wireless device 102, and can be, for example, a base transceiver station, a radio base station, an eNodeB device, or an enhanced eNodeB device. Access node 104 is in communication with communication network 108 over communication link 114, and access node 106 is in communication with communication network 108 over communication link 116. In an embodiment, access node 104 is associated with a first communication network and access node 106 is associated with a second communication network.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, and 116 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104, access node 106 and communication network 108 which are omitted for clarity, including additional processing nodes, routers, gateways, and physical and/or wireless data links for carrying data among the various network elements.

Area 118 comprises an area where access node 104 cannot be detected by wireless device 102, or where a signal level from access node 104 drops below a required threshold signal level. Where access node 104 is associated with a first communication network and access node is associated with a second communication network, area 118 can be outside of a coverage of the first communication network. Area 118 can comprise a coverage hole or gap in a coverage area of access node 104. Area 118 can also comprise a coverage hole or gap between two or more access nodes of the first communication network. A coverage hole can be caused by topgraphical barriers (e.g., hills, mountains, etc.), structural barriers (e.g., buildings and other artificial structures), radio frequency interference, and the like.

When the received signal level drops below the threshold level requirement, communication system 100 will typically attempt to maintain communication with wireless device 102 by identifying a second access node (such as access node 106) and instructing wireless device 102 to communicate with the second access node. Such network behavior is not necessarily efficient. For example, where a coverage hole is small, or where wireless device 102 is highly mobile, the length of time that wireless device 102 will be in the coverage hole can be relatively short, and wireless device 102 may quickly re-enter an area covered by access node 104, or by another access node of the first communication network. In such case, performing a handover of wireless device 102 to access node 106 creates unnecessary signaling traffic in communication system 100, both to access nodes 104 and 106 and to wireless device 102. Further, any additional handover increases the possibility that a communication session will be dropped or terminated. Moreover, where access node 106 is associated with a second communication network, each time that a wireless device is instructed to communicate with access node 106, the first communication network can be assessed a usage fee (such as a roaming charge or other fee for use of the second communication network).

In operation, a plurality of wireless devices are monitored while they are in communication with a first communication network to determine a plurality locations where the plurality of wireless devices change from communicating with the first communication network to communicating with a second communication network. Area 118 is an example of such a location. A record is sent to wireless device 102, typically when wireless device 102 is in communication with the first communication network, the record comprising a plurality locations where the other wireless devices have changed from communicating with the first communication network to communicating with the second communication network, as well as a plurality of timer durations. The locations and the timer durations are typically correlated, so that at least one of the plurality of timer durations is associated with one of the plurality of locations. When it is determined that wireless device 102 enters one of the plurality of locations (for example, area 118), a timer is started using the at least one timer duration associated with the entered location. Before the at least one timer expires, wireless device 102 is prevented from changing from communicating with the first communication network to communicating with the second communication network. In an embodiment, wireless device 102 is prevented from requesting that a handover be performed to instruct wireless device 102 to communicate with access node 106. When the timer expires, wireless device 102 can be instructed to change from communicating with the first communication network to communicating with the second communication network.

Figure 2:
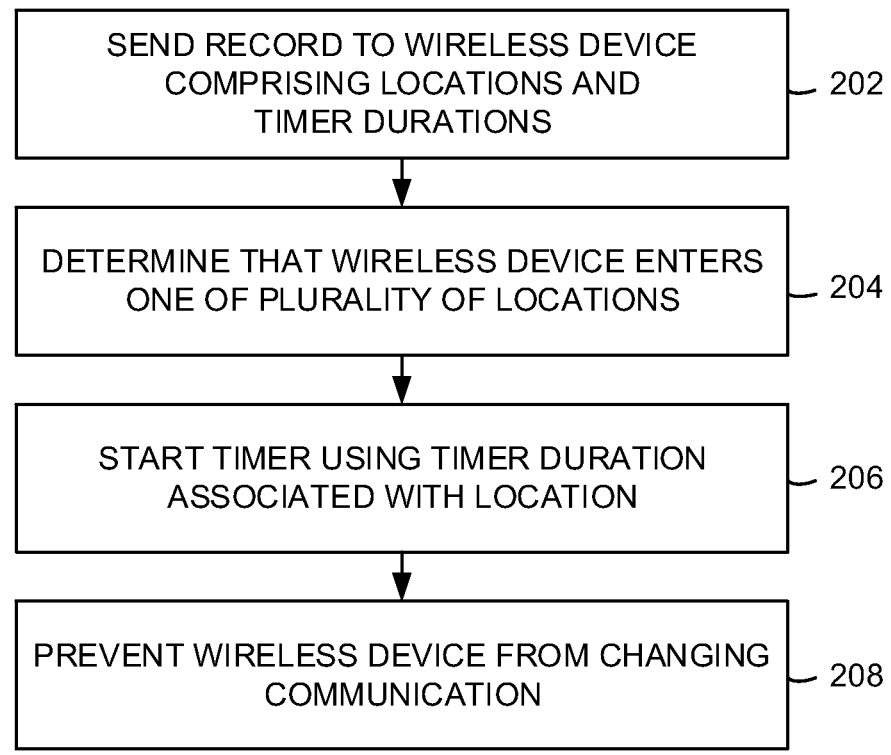
FIG. 2 illustrates an exemplary method of managing network selection for wireless device communication.

FIG. 2 illustrates an exemplary method of managing network selection for wireless device communication. In operation 202, a record is sent to a wireless device when the wireless device is in communication with a first communication network. For example, when wireless device 102 powers up, or when wireless device establishes communication with an access node associated with the first communication network (such as access node 104), the record can be sent to wireless device 102. The record can comprise a plurality locations where other wireless devices have changed from communicating with the first communication network to communicating with a second communication network. The record can further comprise at least one timer duration which is associated with one of the plurality of locations. For example, referring to FIG. 3, the record can comprise the location of area 312, in which other wireless devices have changed from communicating with the first communication network to communicating with a second communication network. Access nodes 304 and 308 can be associated with a first communication network, and access node 306, which is located within area 312, can be associated with a second communication network. Area 312 can be outside of a coverage of the first communication network. Area 312 can comprise a coverage hole or gap in a coverage area of access node 304. Area 312 can also comprise a coverage hole or gap between access nodes 304 and 308 of the first communication network. Area 312 can further comprise a coverage hole caused by topographical barriers (e.g., hills, mountains, etc.), structural barriers (e.g., buildings and other artificial structures), radio frequency interference, and the like. The record send to the wireless device can comprise a location of area 312 and at least one timer duration associated with area 312.

Figure 3:
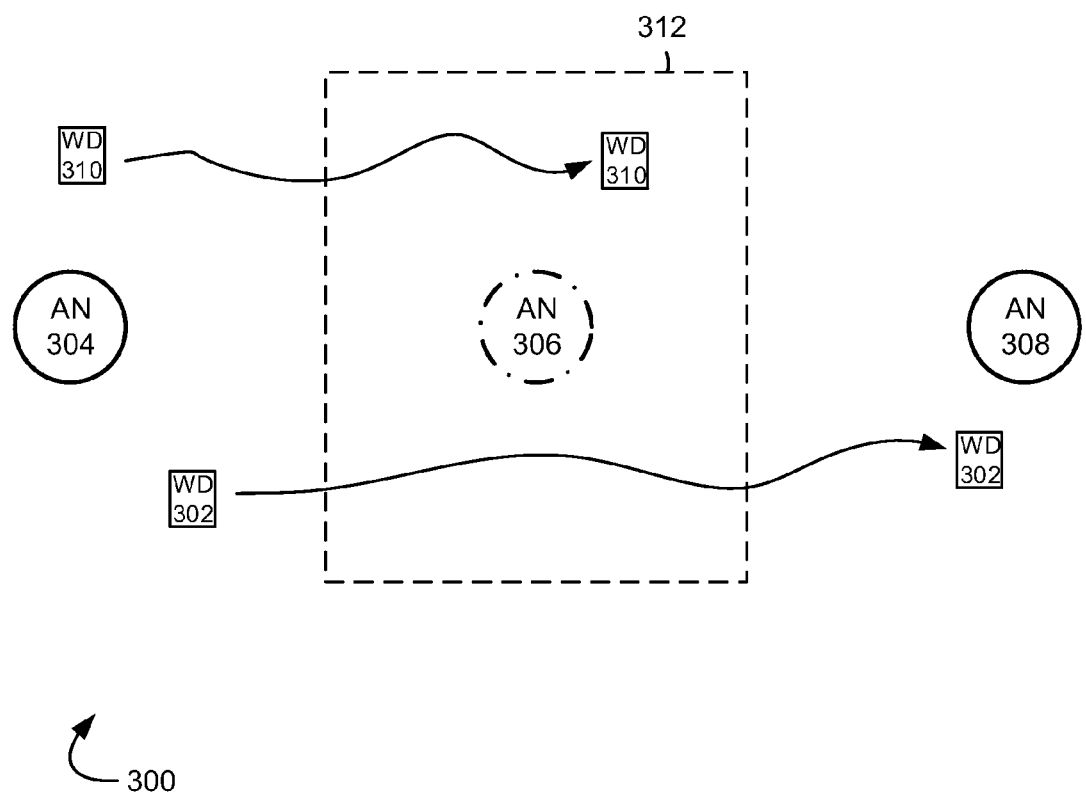
FIG. 3 illustrates exemplary wireless devices and access nodes.

Returning to FIG. 2, it can be determined that the wireless device has entered one of the plurality of locations (operation 204). For example, it can be determined that wireless device 302 has entered area 312 (FIG. 3). The determination can be made based on, for example, location information of wireless device 302, such as can be determined from GPS information of wireless device 302, or base station triangulation, or another similar method of determining a location of wireless device 302. The determination of a location of wireless device 302 can also be made based on a signal level of access node 304, which may drop below a threshold signal level when wireless device 302 enters area 312. The determination can also be made based on a network identifier received by wireless device 302, such as a public land mobile network (PLMN) ID or similar network identifier. When wireless device 302 enters area 312, wireless device 302 may also receive a PLMN ID broadcast by access node 306, and the PLMN ID of access node 306 can be associated with the second communication network. Other methods of determining a location of wireless device 302 are also possible, including combinations of the foregoing.

Referring again to FIG. 2, when the wireless device enters one of the plurality of locations, a timer is started using the at least one timer duration associated with the entered location (operation 206). For example, when wireless device 302 (FIG. 3) enters area 312, the wireless device can determine from the received record at least one timer duration associated with area 312. Using the at least one timer duration, a timer can be started on wireless device 302 using the at least one timer duration.

Then, in operation 208 (FIG. 2), before the at least one timer expires, the wireless device is prevented from changing from communicating with the first communication network to communicating with the second communication network. For example, while the at least one timer is running, wireless device 302 (FIG. 3) can execute instructions which prevent wireless device 302 from requesting that a handover be performed to hand over wireless device 302 to access node 306. In another example, while the at least one timer is running, another network element such as a controller node in a communication network (for example, a mobility management entity (MME), or a mobile switching center (MSC), or a dispatch call controller (DCC), or another similar network node) can prevent the performance of a handover of wireless device 302 to access node 306.

Figure 4:
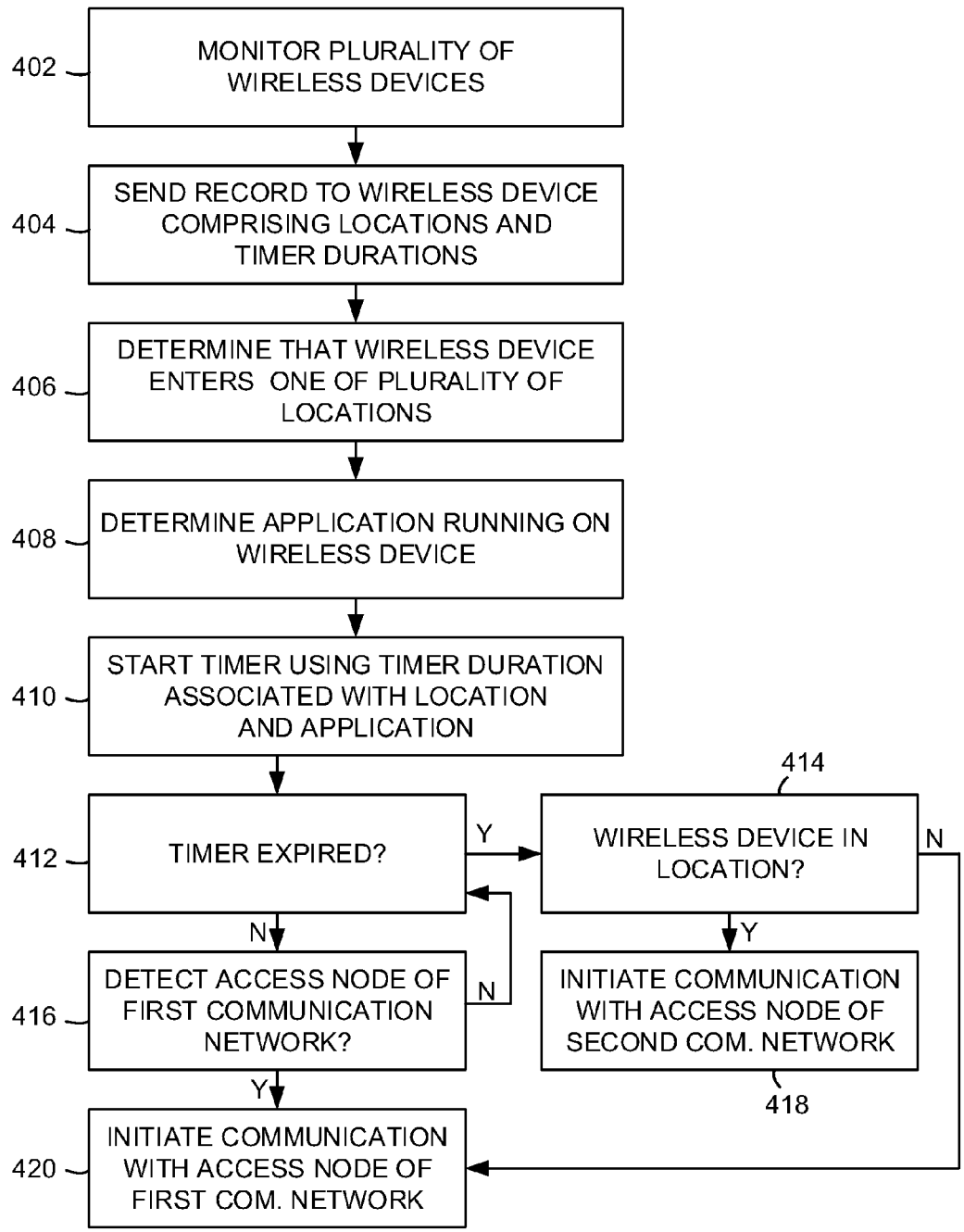
FIG. 4 illustrates another exemplary method of managing network selection for wireless device communication.

FIG. 4 illustrates another exemplary method of managing network selection for wireless device communication. In operation 402, a plurality of wireless devices are monitored while they are in communication with a first communication network to determine a plurality locations where the plurality of wireless devices change from communicating with the first communication network to communicating with a second communication network. For example, wireless devices associated with the first communication can be monitored, and area 312 (FIG. 3) can be identified as a location where the plurality of wireless devices change from communicating with access node 304 or access node 308, which are associated with the first communication network, to communicating with access node 306, which is associated with the second communication network. In operation, a plurality of locations such as area 312 can be identified.

Further, based on the monitoring of the plurality of wireless devices, a plurality of timer durations can be determined, where at least one of the plurality of timer durations is associated with a determined area (e.g., area 312). For example, an average time in which a wireless device moves through area 312 from a coverage area of access node 304 to a coverage area of access node 308 (or vice versa) can be determined based on the monitoring of the plurality of wireless devices. Similarly, a maximum time or longest time in which a wireless device moves through area 312 from a coverage area of access node 304 to a coverage area of access node 308 (or vice versa) can be determined. The plurality of timer durations can be based on one or more determinations of such time periods.

In operation 404, a record is sent to a wireless device when the wireless device is in communication with a first communication network. The record can be sent to wireless device 302, for example, when wireless device 302 powers up, or when wireless device establishes communication with an access node associated with the first communication network (such as access node 304). The record can comprise the plurality locations where other wireless devices have changed from communicating with the first communication network to communicating with a second communication network, and the at least one timer duration which is associated with one of the plurality of locations.

It can be determined that the wireless device has entered one of the plurality of locations (operation 406). The determination can be made based on, for example, location information of wireless device 302, such as can be determined from GPS information of wireless device 302, or base station triangulation, or another similar method of determining a location of wireless device 302. The determination of a location of wireless device 302 can also be made based on a signal level of access node 304, which may drop below a threshold signal level when wireless device 302 enters area 312. The determination can also be made based on a network identifier received by wireless device 302, such as a PLMN ID or similar network identifier. When wireless device enters area 312, wireless device 302 may also receive a PLMN ID broadcast by access node 306, and the PLMN ID of access node 306 can be associated with the second communication network. Other methods of determining a location of wireless device are also possible, including combinations of the foregoing.

When the wireless device enters one of the plurality of locations, an application running on the wireless device is determined (operation 408), and a timer is started using a timer the at least one timer duration associated with the entered location and the determined application running on the wireless device (operation 410). For example, when wireless device 302 enters area 312 (FIG. 3), the wireless device can determine from the received record at least one timer duration associated with area 312. Using the at least one timer duration, a timer can be started on wireless device 302 using the at least one timer duration.

The timer can further be based on the application running on the wireless device. For example, an application type can be determined for the application and the application type can be used to further determine the timer value. An application type can be based on an application requirement, such as a required data rate, permitted data delay, required throughput, permitted error rate, permitted data loss rate, and the like. For example, a delay sensitive application can comprise a relatively high required minimum data rate, a relatively low maximum permitted data delay, a relatively high minimum required throughput, a relatively low maximum permitted error rate, a relatively low maximum permitted data loss rate, and so forth. Conversely, a delay insensitive application can comprise a relatively low required minimum data rate, a relatively high maximum permitted data delay, a relatively high minimum required throughput, a relatively low maximum permitted error rate, a relatively low maximum permitted data loss rate, and so forth. The actual timer duration applied can be adjusted to be longer or shorter based on the application requirements of the application running on the wireless device.

Returning to FIG. 4, when the timer is running (i.e., has not expired, operation 412-N), it is determined whether an access node associated with the first communication network is detected (operation 416). For example, wireless device 302 (FIG. 3) can move across area 312 before the timer expires, and can determine that it has entered a coverage area of access node 308. Similarly, wireless device 302 can detect access node 304, or another access node associated with the first communication network. When the wireless device detects an access node associated with the first communication network, the wireless device can initiate communication with the access node associated with the first communication network (operation 420).

When it is determined that the timer has expired (operation 412-Y), it is determined whether the wireless device is still in the location (operation 414). For example, a timer of wireless device 310 (FIG. 3) can expire when wireless device 310 is located in area 312, where wireless device 310 cannot detect an access node associated with the first communication network. When the wireless device is still in the location (operation 414-Y), the wireless device can initiate communication with an access node associated with the second communication network, such as access node 306 (operation 418). Thus, a balance can be struck between keeping a wireless device on the first communication network as long as practical, and delivering information and services to the wireless device.

When it is determined that the timer has expired, and that the wireless device is not in the location (operation 414-N), the wireless device can initiate communication with an access node of the first communication network (operation 420). The wireless device can be instructed to scan for and attempt to detect an access node of the first communication network if the wireless device has not already detected one. For example, wireless device 302 may move outside of area 312 before the timer expires, and yet may not immediately detect an access node of the first communication network. In such case, wireless device 302 can be instructed to scan for an access node of the first communication network, and wireless device 302 may detect access node 308, which is associated with the first communication network.

Figure 5:
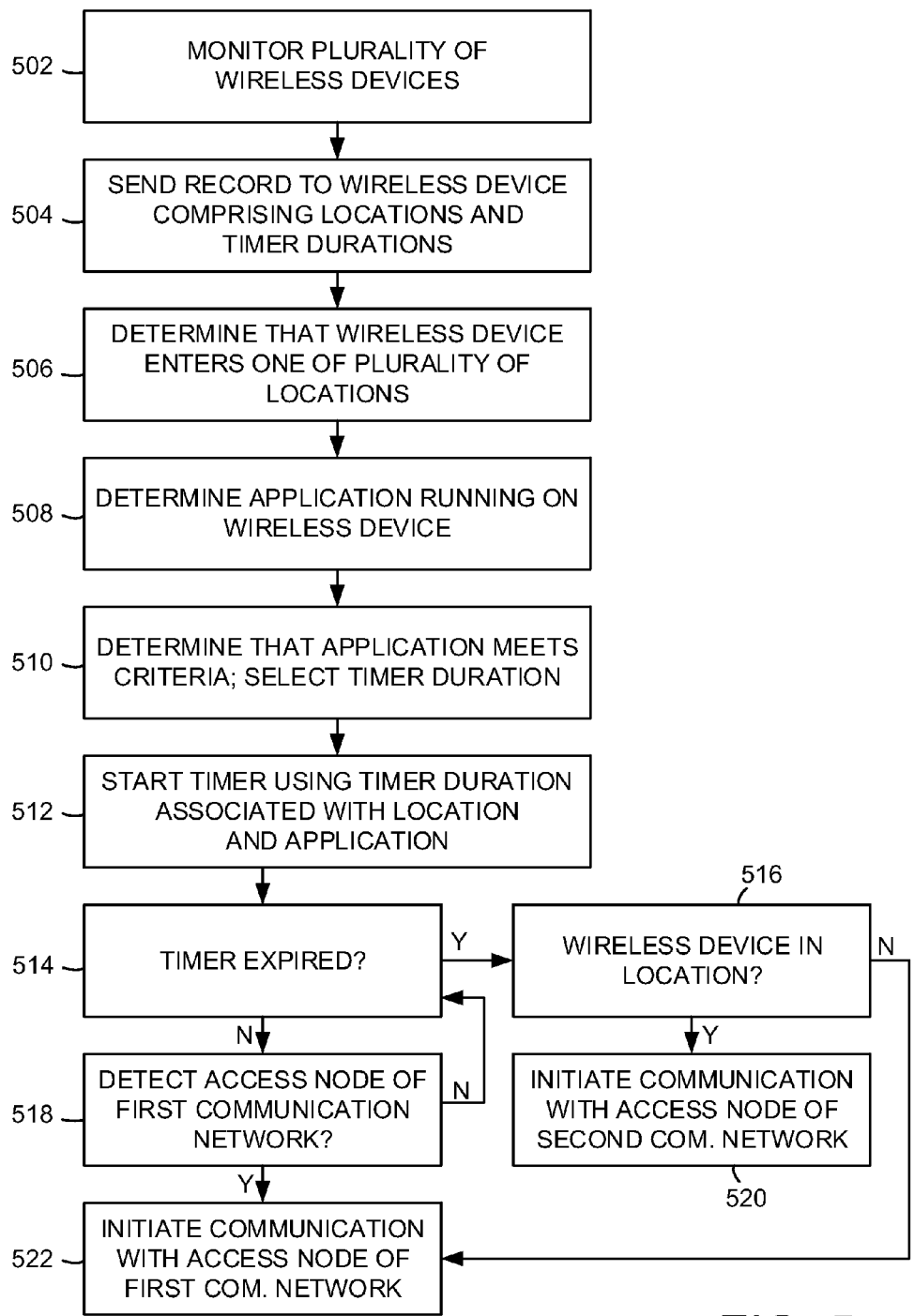
FIG. 5 illustrates another exemplary method of managing network selection for wireless device communication.

FIG. 5 illustrates another exemplary method of managing network selection for wireless device communication. In operation 502, a plurality of wireless devices are monitored while they are in communication with a first communication network to determine a plurality locations where the plurality of wireless devices change from communicating with the first communication network to communicating with a second communication network. For example, wireless devices associated with the first communication can be monitored, and area 312 (FIG. 3) can be identified as a location where the plurality of wireless devices change from communicating with access node 304 or access node 308, which are associated with the first communication network, to communicating with access node 306, which is associated with the second communication network. It will be appreciated that in operation a plurality of locations such as area 312 can be identified.

Further, based on the monitoring of the plurality of wireless devices, a plurality of timer durations can be determined, where at least one of the plurality of timer durations is associated with a determined area (e.g., area 312). For example, an average time in which a wireless device moves through area 312 from a coverage area of access node 304 to a coverage area of access node 308 (or vice versa) can be determined based on the monitoring of the plurality of wireless devices. Similarly, a maximum time or longest time in which a wireless device moves through area 312 from a coverage area of access node 304 to a coverage area of access node 308 (or vice versa) can be determined. The plurality of timer durations can be based on one or more determinations of such time periods.

Other factors can be reflected in the plurality of timer durations. For example, an application running on the plurality of wireless devices when each enters the determined area can be determined. It can be determined whether the application running on each wireless device is a delay sensitive or a delay insensitive application. It can also be determined whether the application is running in the foreground of the wireless device or in the background, which can further affect an application requirement of the application. An application can be running in the foreground of a wireless device, for example, when it is receiving input at a user interface of the wireless device, or when it is providing an output through one or more output components of the wireless device (such as a display, a speaker, a haptic feedback mechanism, and the like) An application can be running in the background of the wireless device, for example, when it is not actively receiving input, or actively providing an output, such as when an application is monitoring for information received from a communication network. Examples of an application running in the background include a VoIP application monitoring for a call request, a weather application monitoring for updates, an email application periodically checking for new messages, and the like. In an embodiment, when an application is running in the foreground, the timer duration can be decreased, and when an application is running in the background, the timer duration can be increased.

The plurality of timers can also reflect whether a wireless device is associated with a type of subscriber account, such as a postpaid account, or a prepaid account, or whether the wireless device is associated with a consumer customer type or a corporate customer type. A different timer value can be determined for each of the types of applications, application requirements, payment criteria, and customer types. For example, when a wireless device is associated with a postpaid account, the timer duration can be decreased, and when the wireless device is associated with a prepaid account, the timer duration can be increased. As another example, when the wireless device is associated with a corporate account, the timer duration can be decreased, and when the wireless device is associated with a consumer account, the timer duration can be increased. Other factors reflected in the plurality of timer durations are also possible, including combinations of the foregoing.

In operation 504, a record is sent to a wireless device when the wireless device is in communication with a first communication network. The record can be sent to wireless device 302, for example, when wireless device 302 powers up, or when wireless device establishes communication with an access node associated with the first communication network (such as access node 304). The record can comprise the plurality locations where other wireless devices have changed from communicating with the first communication network to communicating with a second communication network, and the at least one timer duration which is associated with one of the plurality of locations.

It can be determined that the wireless device has entered one of the plurality of locations (operation 506). The determination can be made based on, for example, location information of wireless device 302, such as can be determined from GPS information of wireless device 302, or base station triangulation, or another similar method of determining a location of wireless device 302. The determination of a location of wireless device 302 can also be made based on a signal level of access node 304, which may drop below a threshold signal level when wireless device 302 enters area 312. The determination can also be made based on a network identifier received by wireless device 302, such as PLMN ID or similar network identifier. When wireless device enters area 312, wireless device 302 may also receive a PLMN ID broadcast by access node 306, and the PLMN ID of access node 306 can be associated with the second communication network. Other methods of determining a location of wireless are also possible, including combinations of the foregoing.

When the wireless device enters one of the plurality of locations, an application running on the wireless device is determined (operation 508). Based on the determined application, it can be determined that the application meets a criteria, and a timer duration can be selected (operation 510). For example, it can be determined that the application meets a first criteria, and a timer duration can be selected based on the location and the first criteria. The first criteria can be met when the application comprises a delay sensitive application. It can also be determined that the application meets a second criteria, and a timer duration can be selected based on the location and the second criteria. The second criteria can be met when the application comprises a delay insensitive application.

It can further be determined that the application meets a third criteria, and a timer duration can be selected based on the location and the third criteria. The third criteria can be met when the application is running in the foreground of the wireless device. It can also be determined that the application meets a fourth criteria, and a timer duration can be selected based on the location and the fourth criteria. The fourth criteria can be met when the application is running in the background of the wireless device.

The wireless device can additionally be associated with a payment criteria, and the payment criteria can be associated with an application running on the wireless device. The timer duration can further be selected based on whether the wireless device meets the payment criteria. In an embodiment, the payment criteria can be associated with a subscription or an account of the wireless device, or the payment criteria can be associated with an application running on the wireless device. For example, it can be determined that the wireless device meets a fifth criteria, and a timer duration can be selected based on the location and the fifth criteria. The fifth criteria can be met when the wireless device is associated with a postpaid subscription or postpaid account. It can also be determined that the application meets a sixth criteria, and a timer duration can be selected based on the location and the sixth criteria. The sixth criteria can be met when the wireless device is associated with a prepaid subscription or prepaid account. In an embodiment, when a wireless device is associated with a postpaid account, the timer duration can be decreased, and when the wireless device is associated with a prepaid account, the timer duration can be increased.

The wireless device can further be associated with a customer type criteria of the wireless device, and the customer type criteria can be associated with an application running on the wireless device. For example, it can be determined that the wireless device meets a seventh criteria, and a timer duration can be selected based on the location and the seventh criteria. The seventh criteria can be met when the wireless device is associated with a consumer subscription or account. It can also be determined that the application meets an eighth criteria, and a timer duration can be selected based on the location and the eighth criteria. The eighth criteria can be met when the wireless device is associated with a corporate subscription or account. In an embodiment, when the wireless device is associated with a corporate account, the timer duration can be decreased, and when the wireless device is associated with a consumer account, the timer duration can be increased. Other wireless device criteria which can be used to adjust the timer duration are also possible, including combinations of the foregoing.

In operation 512, a timer is started using a selected timer duration. When the timer is running (i.e., has not expired, operation 514-N), it is determined whether an access node associated with the first communication network is detected (operation 518). For example, wireless device 302 (FIG. 3) can move across area 312 before the timer expires, and can determine that it has entered a coverage area of access node 308. Similarly, wireless device 302 can detect access node 304, or another access node associated with the first communication network. When the wireless device detects an access node associated with the first communication network, the wireless device can initiate communication with the access node associated with the first communication network (operation 522).

When it is determined that the timer has expired (operation 514-Y), it is determined whether the wireless device is still in the location (operation 516). For example, a timer of wireless device 310 (FIG. 3) can expire when wireless device 310 is located in area 312, where wireless device 310 cannot detect an access node associated with the first communication network. When the wireless device is still in the location (operation 516-Y), the wireless device can initiate communication with an access node associated with the second communication network, such as access node 306 (operation 520). The wireless device can be so instructed in order to balance between keeping the wireless device on the first communication network as long as practical, and delivering information and services to the wireless device.

When it is determined that the timer has expired, and that the wireless device is not in the location (operation 516-N), the wireless device can initiate communication with an access node of the first communication network (operation 522). The wireless device can be instructed to scan for and attempt to detect an access node of the first communication network if the wireless device has not already detected one. For example, wireless device 302 may move outside of area 312 before the timer expires, and yet may not immediately detect an access node of the first communication network. In such case, wireless device 302 can be instructed to scan for an access node of the first communication network, and wireless device 302 may detect access node 308, which is associated with the first communication network.

Figure 6:
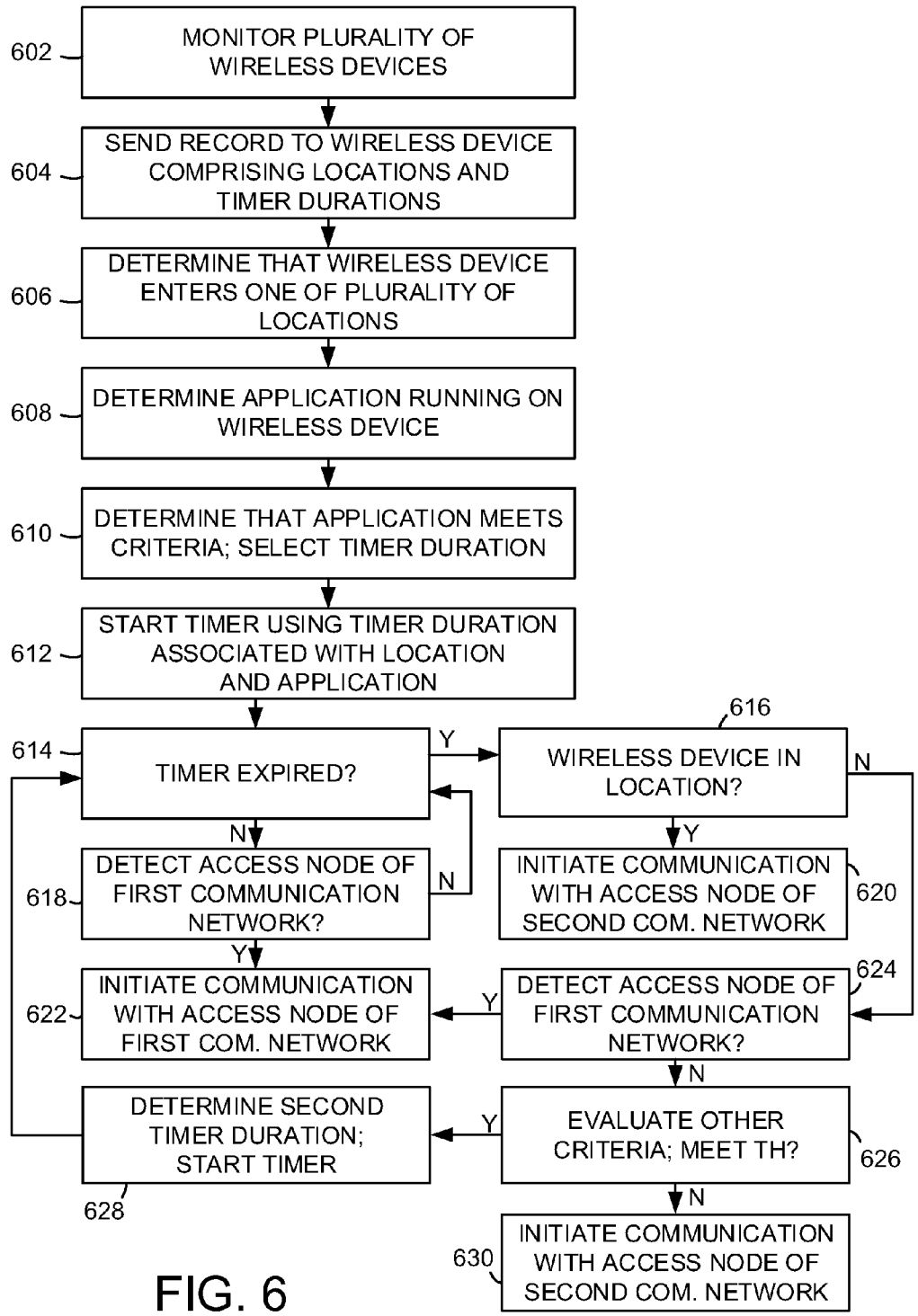
FIG. 6 illustrates another exemplary method of managing network selection for wireless device communication.

FIG. 6 illustrates another exemplary method of managing network selection for wireless device communication. In operation 602, a plurality of wireless devices are monitored while they are in communication with a first communication network to determine a plurality locations where the plurality of wireless devices change from communicating with the first communication network to communicating with a second communication network. For example, wireless devices associated with the first communication can be monitored, and area 312 (FIG. 3) can be identified as a location where the plurality of wireless devices change from communicating with access node 304 or access node 308, which are associated with the first communication network, to communicating with access node 306, which is associated with the second communication network. It will be appreciated that in operation a plurality of locations such as area 312 can be identified.

Further, based on the monitoring of the plurality of wireless devices, a plurality of timer durations can be determined, where at least one of the plurality of timer durations is associated with a determined area (e.g., area 312). For example, an average time in which a wireless device moves through area 312 from a coverage area of access node 304 to a coverage area of access node 308 (or vice versa) can be determined based on the monitoring of the plurality of wireless devices. Similarly, a maximum time or longest time in which a wireless device moves through area 312 from a coverage area of access node 304 to a coverage area of access node 308 (or vice versa) can be determined. The plurality of timer durations can be based on one or more determinations of such time periods.

Other factors can be reflected in the plurality of timer durations. For example, an application running on the plurality of wireless devices when each enters the determined area can be determined. It can be determined whether the application running on each wireless device is a delay sensitive or a delay insensitive application. It can also be determined whether the application is running in the foreground of the wireless device or in the background, which can further affect an application requirement of the application. An application can be running in the foreground of a wireless device, for example, when it is receiving input at a user interface of the wireless device, or when it is providing an output through one or more output components of the wireless device (such as display, a speaker, a haptic feedback mechanism, and the like) An application can be running in the background of the wireless device, for example, when it is not actively receiving input, or actively providing an output, such as when an application is monitoring for information received from a communication network. Examples of an application running in the background include a VoIP application monitoring for a call request, a weather application monitoring for updates, an email application periodically checking for new messages, and the like. In an embodiment, when an application is running in the foreground, the timer duration can be decreased, and when an application is running in the background, the timer duration can be increased.

The plurality of timers can also reflect whether a wireless device is associated with a type of subscriber account, such as a postpaid account, or a prepaid account, or whether the wireless device is associated with a consumer customer type or a corporate customer type. A different timer value can be determined for each of the types of applications, application requirements, payment criteria, and customer types. For example, when a wireless device is associated with a postpaid account, the timer duration can be decreased, and when the wireless device is associated with a prepaid account, the timer duration can be increased. As another example, when the wireless device is associated with a corporate account, the timer duration can be decreased, and when the wireless device is associated with a consumer account, the timer duration can be increased. Other factors reflected in the plurality of timer durations are also possible, including combinations of the foregoing.

In operation 604, a record is sent to a wireless device when the wireless device is in communication with a first communication network. The record can be sent to wireless device 302, for example, when wireless device 302 powers up, or when wireless device establishes communication with an access node associated with the first communication network (such as access node 304). The record can comprise the plurality locations where other wireless devices have changed from communicating with the first communication network to communicating with a second communication network, and the at least one timer duration which is associated with one of the plurality of locations.

It can be determined that the wireless device has entered one of the plurality of locations (operation 606). The determination can be made based on, for example, location information of wireless device 302, such as can be determined from GPS information of wireless device 302, or base station triangulation, or another similar method of determining a location of wireless device 302. The determination of a location of wireless device 302 can also be made based on a signal level of access node 304, which may drop below a threshold signal level when wireless device 302 enters area 312. The determination can also be made based on a network identifier received by wireless device 302, such as PLMN ID or similar network identifier. When wireless device enters area 312, wireless device 302 may also receive a PLMN ID broadcast by access node 306, and the PLMN ID of access node 306 can be associated with the second communication network. Other methods of determining a location of wireless are also possible, including combinations of the foregoing.

When the wireless device enters one of the plurality of locations, an application running on the wireless device is determined (operation 608). Based on the determined application, it can be determined that the application meets a criteria, and a timer duration can be selected (operation 610). For example, it can be determined that the application meets a first criteria, and a timer duration can be selected based on the location and the first criteria. The first criteria can be met when the application comprises a delay sensitive application. It can also be determined that the application meets a second criteria, and a timer duration can be selected based on the location and the second criteria. The second criteria can be met when the application comprises a delay insensitive application.

It can further be determined that the application meets a third criteria, and a timer duration can be selected based on the location and the third criteria. The third criteria can be met when the application is running in the foreground of the wireless device. It can also be determined that the application meets a fourth criteria, and a timer duration can be selected based on the location and the fourth criteria. The fourth criteria can be met when the application is running in the background of the wireless device.

The wireless device can additionally be associated with a payment criteria, and the payment criteria can be associated with an application running on the wireless device. The timer duration can further be selected based on whether the wireless device meets the payment criteria. In an embodiment, the payment criteria can be associated with a subscription or an account of the wireless device, or the payment criteria can be associated with an application running on the wireless device. For example, it can be determined that the wireless device meets a fifth criteria, and a timer duration can be selected based on the location and the fifth criteria. The fifth criteria can be met when the wireless device is associated with a postpaid subscription or postpaid account. It can also be determined that the application meets a sixth criteria, and a timer duration can be selected based on the location and the sixth criteria. The sixth criteria can be met when the wireless device is associated with a prepaid subscription or prepaid account. In an embodiment, when a wireless device is associated with a postpaid account, the timer duration can be decreased, and when the wireless device is associated with a prepaid account, the timer duration can be increased.

The wireless device can further be associated with a customer type criteria of the wireless device, and the customer type criteria can be associated with an application running on the wireless device. For example, it can be determined that the wireless device meets a seventh criteria, and a timer duration can be selected based on the location and the seventh criteria. The seventh criteria can be met when the wireless device is associated with a consumer subscription or account. It can also be determined that the application meets an eighth criteria, and a timer duration can be selected based on the location and the eighth criteria. The eighth criteria can be met when the wireless device is associated with a corporate subscription or account. In an embodiment, when the wireless device is associated with a corporate account, the timer duration can be decreased, and when the wireless device is associated with a consumer account, the timer duration can be increased. Other wireless device criteria which can be used to adjust the timer duration are also possible, including combinations of the foregoing.

In operation 612, a timer is started using a selected timer duration. When the timer is running (i.e., has not expired, operation 614-N), it is determined whether an access node associated with the first communication network is detected (operation 618). For example, wireless device 302 (FIG. 3) can move across area 312 before the timer expires, and can determine that it has entered a coverage area of access node 308. Similarly, wireless device 302 can detect access node 304, or another access node associated with the first communication network. When the wireless device detects an access node associated with the first communication network, the wireless device can initiate communication with the access node associated with the first communication network (operation 622).

When it is determined that the timer has expired (operation 614-Y), it is determined whether the wireless device is still in the location (operation 616). For example, a timer of wireless device 310 (FIG. 3) can expire when wireless device 310 is located in area 312, where wireless device 310 cannot detect an access node associated with the first communication network. When the wireless device is still in the location (operation 616-Y), the wireless device can initiate communication with an access node associated with the second communication network, such as access node 306 (operation 620). The wireless device can be so instructed in order to balance between keeping the wireless device on the first communication network as long as practical, and delivering information and services to the wireless device.

When it is determined that the timer has expired, and that the wireless device is not in the location (operation 616-N), it is determined whether an access node associated with the first communication network is detected (operation 624). For example, wireless device 302 (FIG. 3) can move across area 312 before the timer expires, and can determine that it has entered a coverage area of access node 308. Similarly, wireless device 302 can detect access node 304, or another access node associated with the first communication network. The wireless device can be instructed to scan for and attempt to detect an access node of the first communication network if the wireless device has not already detected one. When the wireless device detects an access node associated with the first communication network (operation 624-Y), the wireless device can initiate communication with the access node associated with the first communication network (operation 622).

When the wireless device does not detect an access node associated with the first communication network (operation 624-N), the wireless device can evaluate other criteria and determine if the evaluated criteria meet a threshold (operation 626). For example, the wireless device can determine comprising its location, a speed at which the wireless device is moving, a direction in which the wireless device is moving, and any received signals from access nodes of the first and/or second communication networks (even where such signals do not satisfy a minimum required signal level to support communication with the wireless device). The criteria can also comprise the record, an application type of an application running on the wireless device, whether the application is running in the foreground or the background of the wireless device, a payment criteria of the wireless device, a customer type criteria of the wireless device, and the like, including combinations thereof.

When the evaluated criteria meet a threshold (operation 626-Y), a second timer duration can be determined based on the evaluated criteria and a second timer can be started using the second timer duration (operation 628). The threshold can comprise a duration of time until the wireless device anticipates detection of an access node associated with the first communication network. For example, based on the evaluated criteria wireless device 302 (FIG. 3) may determine that it will be within a coverage area of access node 308 (or access node 304) within a predetermined period of time. A second timer duration can then be determined, based on one or more of the evaluated criteria. While the second timer is running, wireless device 302 will not be instructed to change to communicating with an access node associated with the second communication network. An evaluation of whether the timer has expired, or whether an access node associated with the first communication network is detected, can be performed after the second timer is started (operations 614 and 618). When the evaluated criteria do not meet the threshold (operation 626-N), the wireless device can initiate communication with an access node associated with the second communication network, such as access node 306 (operation 630).

Figure 7:
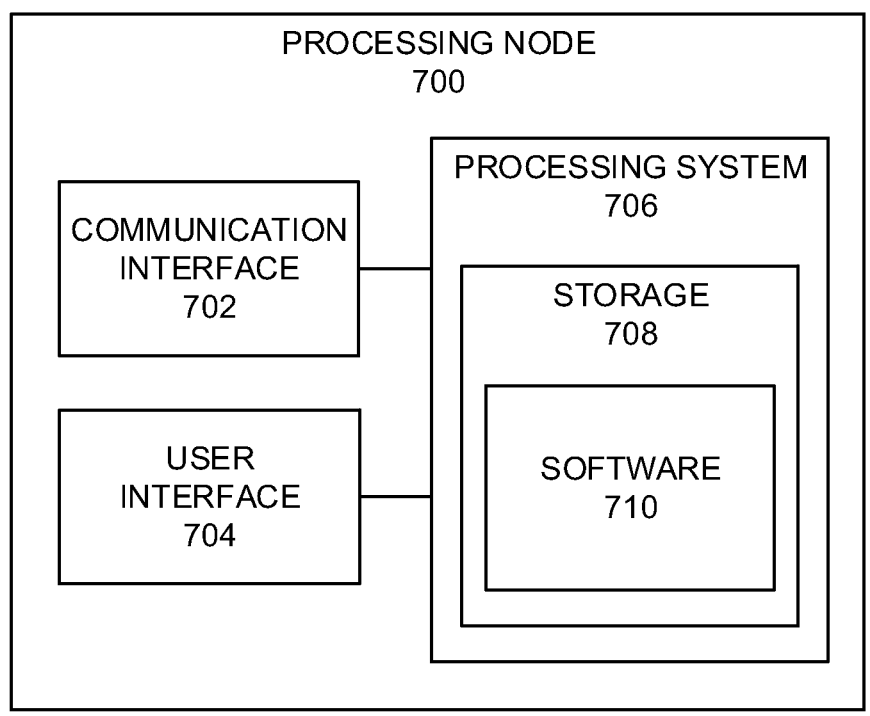
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to manage network selection for wireless device communication. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include access node 104, access node 107, access node 304, access node 306, and access node 308. Processing node 700 can also be an adjunct or component of a network element, such as an element of an access node. Processing node 700 can also be another network element, or an adjunct of another network element, in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing network selection for wireless device communication, comprising:

sending to a wireless device in communication with a first communication network a record comprising a plurality locations where other wireless devices have changed from communicating with the first communication network to communicating with a second communication network and a plurality of timer durations, wherein at least one timer duration is associated with one of the plurality of locations;

determining that the wireless device has entered one of the plurality of locations and starting a timer using the at least one timer duration associated with the entered location; and preventing the wireless device from changing from communicating with the first communication network to communicating with the second communication network before the at least one timer expires.

2. The method of claim 1, further comprising:
instructing the wireless device to change from communicating with the first communication network to communicating with the second communication network when the timer expires.

3. The method of claim 1, further comprising:
instructing the wireless device to change from communicating with the first communication network to communicating with the second communication network when the timer expires and the wireless device is in the entered location.

4. The method of claim 1, wherein the record further comprises a first access node associated with the first communication network and a second access node associated with the second communication network.

5. The method of claim 1, wherein the record further comprises at least one timer duration is associated with each location based on a type of application running on the wireless device when the wireless device is in the entered location.

6. The method of claim 5, wherein the record further comprises a first timer duration associated with each location for an application running on the wireless device which meets a first delay criteria and a second timer duration associated with each location for an application running on the wireless device which meets a second delay criteria.

7. The method of claim 5, wherein the record further comprises a third timer duration associated with each location for an application running on the wireless device which meets a first priority criteria and a fourth timer duration associated with each location for an application running on the wireless device which meets a second priority criteria.

8. The method of claim 1, wherein the record further comprises a fifth timer duration associated with each location when the wireless device meets a first payment criteria and a sixth timer duration associated with each location when the wireless device meets a second payment criteria.

9. The method of claim 1, wherein the record further comprises an seventh timer duration associated with each location when the wireless device meets a first customer type criteria and a eighth timer duration associated with each location when the wireless device meets a second customer type criteria.

10. A method of managing network selection for wireless device communication, comprising:
monitoring a plurality of first wireless devices in communication with a first communication network to determine a plurality locations where the plurality of wireless devices change from communicating with the first communication network to communicating with a second communication network;

determining a plurality of timer durations and associating at least one timer duration with each determined location;

sending to a second wireless device in communication with a first communication network a record comprising the plurality locations and the plurality of timer durations;

determining that the second wireless device has entered one of the plurality of locations and starting a timer using the at least one timer duration associated with the entered location; and preventing the second wireless device from changing from communicating with the first communication network to communicating with the second communication network before the at least one timer expires.

11. The method of claim 10, further comprising:
instructing the second wireless device to change from communicating with the first communication network to communicating with the second communication network when the timer expires.

12. The method of claim 10, further comprising:
instructing the second wireless device to change from communicating with the first communication network to communicating with the second communication network when the timer expires and the second wireless device is in the entered location.

13. The method of claim 10, wherein the record further comprises a first access node associated with the first communication network and a second access node associated with the second communication network.

14. The method of claim 10, wherein the record further comprises at least one timer duration is associated with each location based on a type of application running on the wireless device when the wireless device is in the entered location.

15. The method of claim 14, wherein the record further comprises a first timer duration associated with each location for an application running on the wireless device which meets a first delay criteria and a second timer duration associated with each location for an application running on the wireless device which meets a second delay criteria.

16. The method of claim 14, wherein the record further comprises a third timer duration associated with each location for an application running on the wireless device which meets a first priority criteria and a fourth timer duration associated with each location for an application running on the wireless device which meets a second priority criteria.

17. A system of managing network selection for wireless device communication, comprising:
a processing node configured to
send to a wireless device in communication with a first communication network a record comprising a plurality locations where other wireless devices have changed from communicating with the first communication network to communicating with a second communication network and a plurality of timer durations, wherein at least one timer duration is associated with one of the plurality of locations;

determine that the wireless device has entered one of the plurality of locations and starting a timer using the at least one timer duration associated with the entered location; and prevent the wireless device from changing from communicating with the first communication network to communicating with the second communication network before the at least one timer expires.

18. The system of claim 17, wherein the record further comprises at least one timer duration is associated with each location based on a type of application running on the wireless device when the wireless device is in the entered location.

19. The system of claim 18, wherein the record further comprises a first timer duration associated with each location for an application running on the wireless device which meets a first delay criteria and a second timer duration associated with each location for an application running on the wireless device which meets a second delay criteria.

20. The system of claim 18, wherein the record further comprises a third timer duration associated with each location for an application running on the wireless device which meets a first priority criteria and a fourth timer duration associated with each location for an application running on the wireless device which meets a second priority criteria.

* * * * *